United States Patent [19]

Halm

[11] 3,979,822

[45] Sept. 14, 1976

[54] PROCESS OF MANUFACTURING AN ELECTRIC MOTOR

[76] Inventor: Richard Halm, Silcherstrasse 54, 7061 Baltmannsweiler Kreis Esslingen, Germany

[22] Filed: Feb. 19, 1975

[21] Appl. No.: 550,987

[30] Foreign Application Priority Data

Feb. 23, 1974 Germany............................ 2408782
Feb. 26, 1974 Germany............................ 2409212

[52] U.S. Cl................................. 29/596; 264/272; 310/43; 310/89; 310/260
[51] Int. Cl.²........................................ H02K 15/14
[58] Field of Search............... 29/596, 598; 310/42, 310/43, 89, 260, 270; 264/272

[56] References Cited
UNITED STATES PATENTS

| | | | |
|---|---|---|---|
| 3,075,250 | 1/1963 | Strohm et al. | 29/596 |
| 3,155,856 | 11/1964 | Macha et al. | 310/43 |
| 3,720,914 | 3/1973 | Hallerback | 310/43 |
| 3,827,141 | 8/1974 | Hallerback | 29/596 |

*Primary Examiner*—Carl E. Hall
*Attorney, Agent, or Firm*—Roylance, Abrams, Berdo & Kaul

[57] ABSTRACT

A method of making a motor includes placing radially deformable support cuffs around the protruding winding portion of the stator windings, inserting a core therethrough, placing the assembly in a hollow mould and closing the mould to press the cuffs radially inwardly against the windings, filling the remaining voids in the mould with curable casting material, and curing the material. The resulting unit is removed and the rotor and bearings are inserted. Embodiments of support cuffs are disclosed.

3 Claims, 12 Drawing Figures

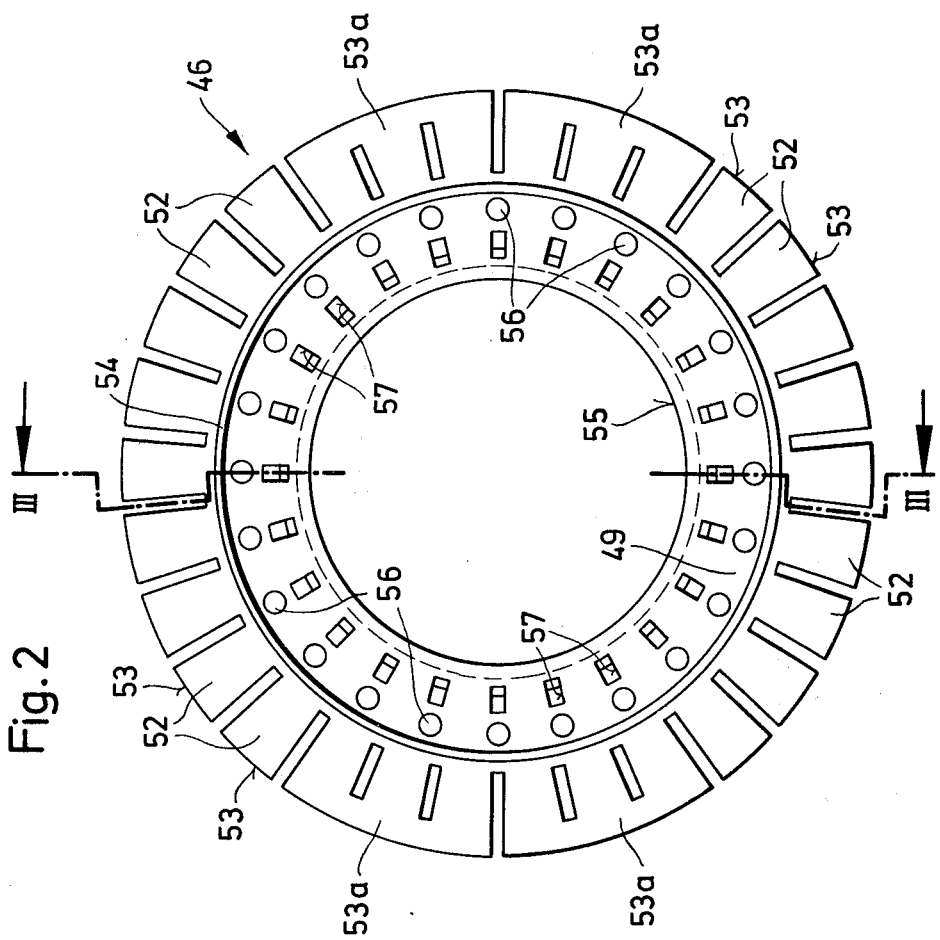
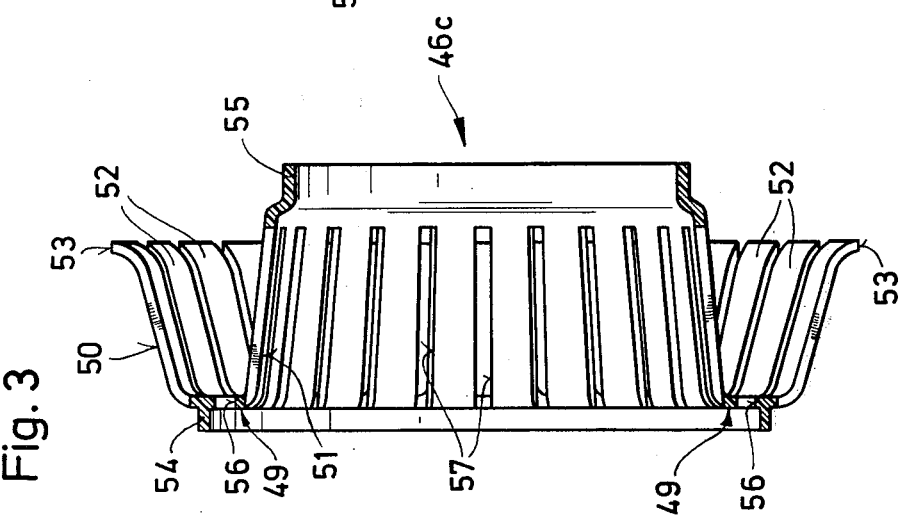

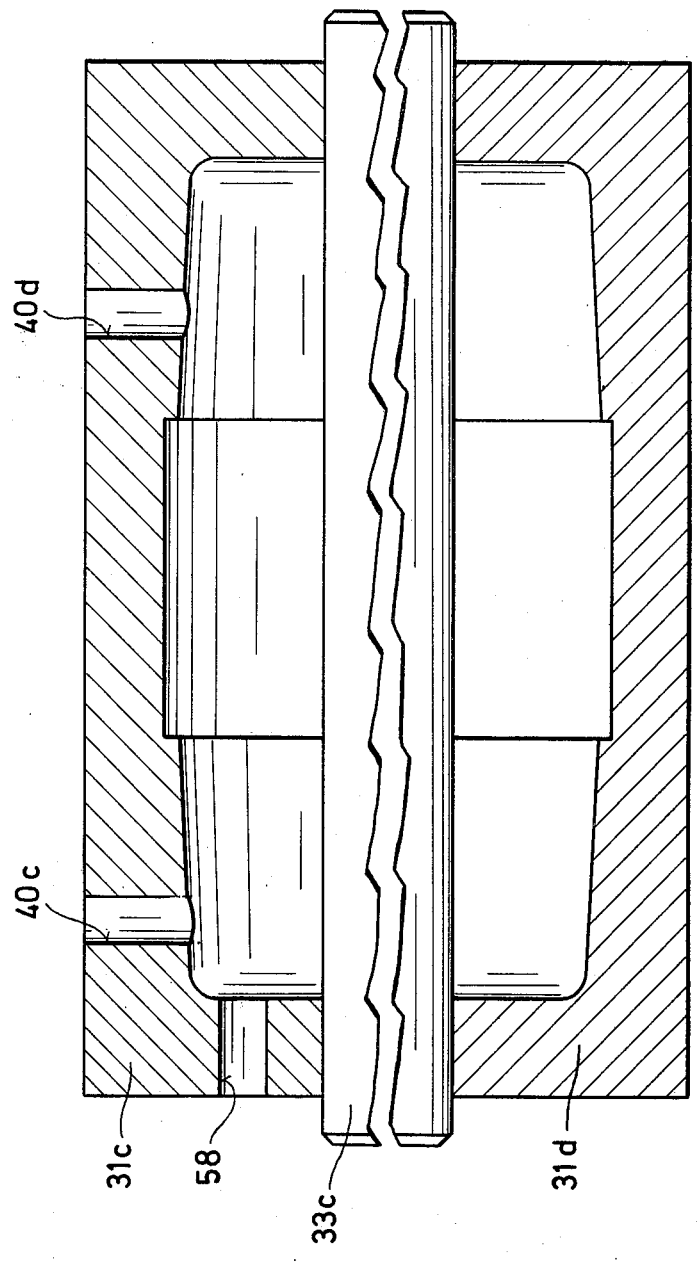

PROCESS OF MANUFACTURING AN ELECTRIC MOTOR

The invention concerns a process and a device for the manufacture of an electric motor containing a rotor, a casing and a stator with a stator winding, particularly a squirrel cage, in which the stator with its winding is inserted into a casing mould in a specified position and the hollow space within the casing mould is filled in by pouring a castable or injectable electrically insulating synthetic material to produce a structural unit consisting of the stator, the stator winding and the casing and wherein a rotor is finally inserted into this structural unit.

A cuff of synthetic material or metal inserted on the inside of the winding and, if desired, flush with its end face must, in each case, be made separately and machined by cutting. The winding is clear of the cuff outside the casing, so that the winding is not always fully embedded in the casing and portions of the winding may be lying outside. The mechanical and electrical safety of the electric motor is endangered if the insulating layer is too thin.

An object of the present invention is to preserve, during the casting of the casing, adequate radial distances between its outside and inside circumferences, on the one hand, and the winding, on the other. The invention accomplishes this task by placing a support cuff over each of the winding portions, protruding laterally beyond the stator, substantially in the axial direction, by aligning the support cuffs with the help of a pin-shaped core forming part of the mould, by pressing radially inwardly the portions of the support cuff situated outside during the insertion into the mould and by casting-in the support cuff with cast synthetic material.

By placing one support cuff each over the winding portions protruding casting the stator, the winding portions surrounded in each case by the support cuffs are kept within the specified range of diameters. The support cuff is aligned coaxially with the stator by a pin. When inserting the pin, which carries the armature and the support cuffs into the mould, the resilient portions of the support cuff which protrude outside are pressed inwardly. In this way, the support cuff, which is radially sprung outwardly to facilitate placing it over a portion of the stator winding, is radially compressed. A distance between the support cuff and the mould is created thereby. When casing around the winding and the support cuff, the cast material penetrates through holes in the support cuff into the winding. Furthermore, on both the inner and outer circumferences of the support cuff a sufficiently thick layer of the cast material forms. Over the inner circumference of the support cuff, the surface defining the location for the bearing to be inserted is also cast at the same time because it is determined by the diameter of the pin. The achievable tolerances are of the order of 0.01 mm. In addition, the manufacture of the casing component is cheaper than when using a pre-formed sleeve which is connected to the casing only on its outside.

The invention is further concerned with an electric motor having a casing to hold at least portions of a stator winding, where the casing portion receiving the stator winding parts consists of a cured castable resin forming a massive piece, in which the winding parts and winding connections situated outside the stator laminations stack are fully embedded and also have a bearing carrier.

The invention also contemplates the provision of an advantageous mounting of the bearing carrier. According to the invention, this is achieved by radially seating the bearing carrier in an unmachined cylindrical surface formed as a cast surface in the casing or in a part attached to it and by retaining the bearing carrier axially with the help of fastening means. The fitting of the bearing carrier in an unmachined cylindrical surface saves machining costs. The bearing carrier is secured in the radial direction by the cylindrical surface and, in the axial direction, by the fastening means.

The invention will be explained, by way of example, with the help of the following drawings wherein:

FIG. 2 shows a portion of the squirrel cage motor of FIG. 1.

FIG. 3 shows a cross-section along the line III—III in FIG. 2.

FIG. 4 shows a longitudinal cross-section through a casing mould.

Figure 1:
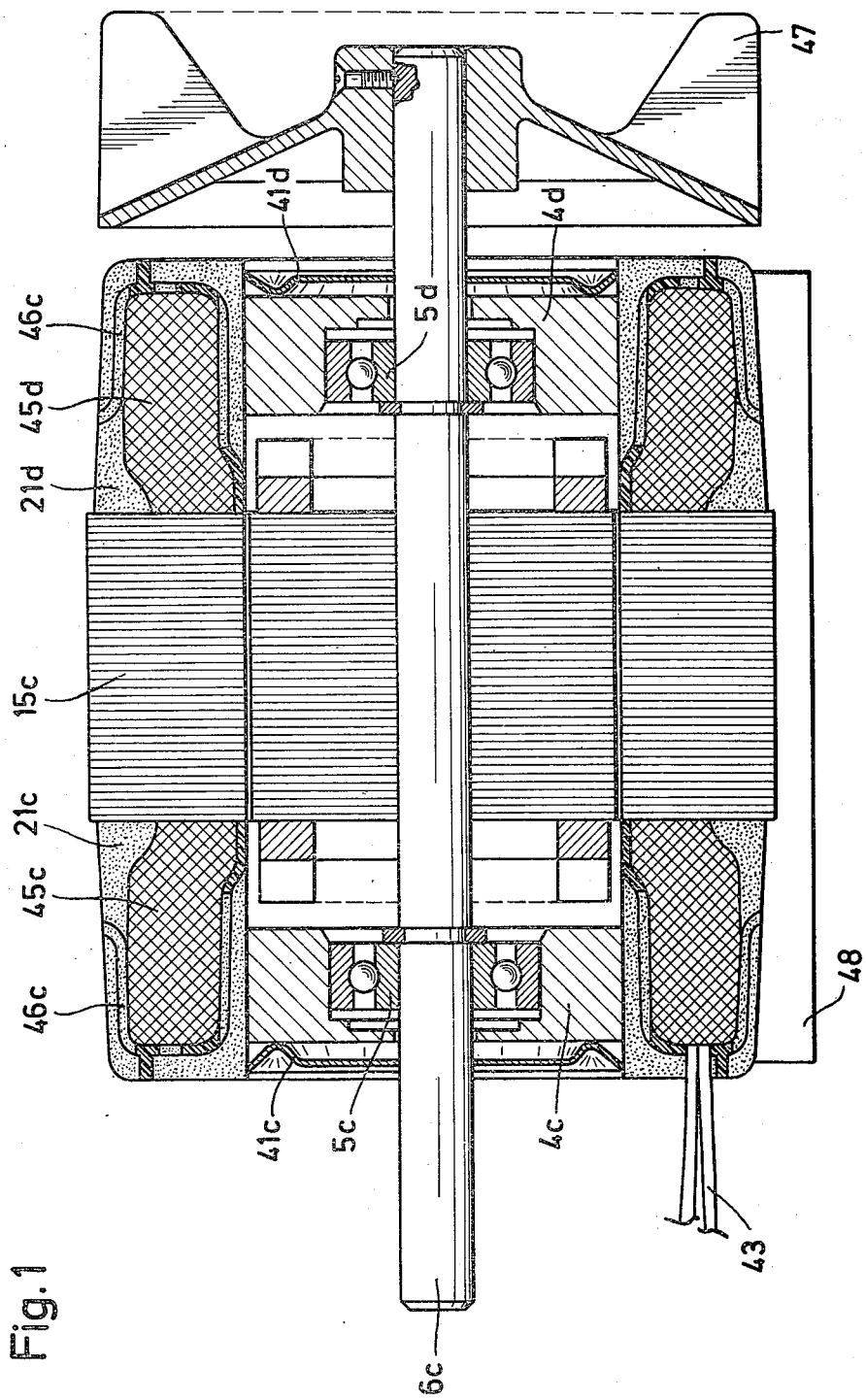
FIG. 1 shows a longitudinal cross-section through a squirrel cage motor.

The squirrel cage motor according to FIG. 1 has a stator 15c with winding portions 45c and 45d, situated at both ends. The winding portions 45c and 45d, respectively, are, in each case, surrounded by a support cuff 46c illustrated in FIGS. 2 and 3. The support cuff is insulated at least against the appropriate winding portions 45c and 45d, respectively. The winding portion 45c and the support cuff 46c are embedded in a hollow cylindrical casing component 21c made of cast resin or similar material, whilst the winding portion 45d and the support cuff 46c surrounding it is embedded in a hollow cylindrical casing component 21d also made of cast resin or similar material. The support cuff 46c, the annular part of which has a U-shaped cross-section, reaches the outside of the casing component 21c or 21d, respectively, only at the ends of the free legs of the 'U' so that the support cuff 46c is essentially surrounded by cast resin over its entire outside surface. This is also true for the inside and the end face side of each of the casing components 21c or 21d, respectively. The inner circumference of the casing components 21c and 21d, respectively, can be manufactured with a tolerance of 0.01 mm.

A bearing block 4c can be inserted into the casing component 21c and a bearing block 4d can be inserted into the casing component 21d. The bearing blocks are, in each case, retained by a sprung retaining ring 41c or 41d, respectively, situated on the outside. The bearing blocks 4c and 4d serve for seating the rolling bearings 5c or 5d, respectively, on which the motor shaft 6c is supported. The shaft carries a rotor in the middle and a fan impeller 47 at one end.

Two mounting feet 48 are cast integrally, with each of the two casing components 21c and 21d. The feet are continuous in the axial direction and substantially extend over the entire length of the motor.

The support cuff 46c, illustrated in FIGS. 2 and 3, is formed as an annular hood, and consists of a heat-resistant thermoplastic resin, a strongly plasticised cast resin, e.g. epoxy resin, or a similar material. As seen in the cross-section of its annular portion, the support cuff has two legs 50 and 51, spread outwardly, emerging from a central web 49 which is in the shape of a closed ring. The web 49 and the legs 50 and 51 are essentially of the same thickness. The support cuff 46c has tabs 52, joined to the web 49 on the side of the leg 50, the ends 53 of which are bent outwardly. About thirty tabs 52 are provided over the circumference. On diametrically opposed sides, groups of several tabs are joined together by a web 53a, three such joined tabs being shown in the example of FIG. 2. Two webs 53a are arranged on each side separated by a distance equal to the distance between two tabs 52.

On the side opposite that of the legs 50, 51, the web 49 has an annular bead 54 of rectangular cross-section. At its free end, the leg 51 forms part of a sizing ring 55 which is radially expanded at its end facing the web 49. Holes 56 are situated between the web 49 and the sizing ring 55 and elongated apertures 57 are arranged in parallel to the axis of the support cuff 46c. The slots between the tabs 52, the holes 56 and the elongated apertures 57 all serve to facilitate the throughflow of the cast material. The inside diameter of the sizing ring 55 is equal to the inside diameter of the casing component 21c or 21d, respectively, whilst the outside diameter of the ends 53 is larger than the outside diameter of the casing component 21c or 21d, respectively. The support cuff may have a reason for the entry of the connecting leads 43 to the electric motor.

The casing mould according to FIG. 4 is made in two parts. The two casing mould parts 31c and 31d are substantially similar. The casing mould parts 31c and 31d receive a cylindrical core 33c and are parted along a plane parallel to its axis. Apertures 40c and 40d in the casing mould part 31c serve for the inflow of the cast resin or similar material. The connecting leads 43 to the electric motor are guided on the outside via an aperture 58 arranged in parallel to the axis of the core 33c. The aperture 58 may also be arranged at right angles to the core similar to one of the apertures 40c or 40d, respectively.

To manufacture the motor, one support cuff 46c is placed over each of the winding portions 45c and 45d substantially in the axial direction of the stator 15c, until the sizing ring 55 of each support cuff is flush with the stator 15c. The outer ends 53 of the support cuff 46c protrude beyond the outside diameter of the stator 15c. The support cuffs 46c are so aligned against each other that the webs 53a of the two support cuffs lie behind each other in parallel to the axial direction of the stator 15c. The stator 15c, together with the support cuffs 46c, is then pushed over the core 33c, whereby the support cuffs 46c are centered in relation to the stator 15c by means of their sizing rings 55, both of which are seated with a close fit on the core 33c. The core 33c, carrying the stator 15c in its middle portion, is inserted into the lower casing mould part 31b in such a way that the webs 53a are flush with the edges of the casing mould part 31d. When inserting the core 33c into the casing mould part 31d, the ends 53 of the support cuffs 46c, held in this mould part, are pressed inwardly by it. After this, the casing mould part 31c is placed in such a way that the webs 53a are flush with the edges of the casing mould part 31c. The remaining ends 53 of the support cuff 46c are also pressed radially inwardly. The support cuff 46c now has a shape such that, with the exception of its ends 53, the annular bead 54 and the sizing ring 55, gaps remain between the support cuff 46c and the casing mould 31c, 31d. The annular bead 54 may serve not only for the axial alignment but also for the radial alignment of the support cuff 46c. To this end, the casing mould parts 31c and 31d have a corresponding abutment shoulder.

When the casing mould 31c, 31d, is closed, cast resin or another castable or injectable electrically insulated moulding substance is poured in via the pouring apertures 40c, 40d. The so-called pressure-curing process can be used in this operation, wherein cast resin in injected into the mould under pressure and cured inside the mould. The cast resin penetrates between the tabs 52 and, via the holes 56 and the elongated apertures 57 in the support cuff 46c, embeds the winding portions 45c and 45d, respectively, as well as the support cuffs 46c.

After the solidification of the cast resin, which may have to be subjected to a heat treatment, the stator 15c is removed from the casing mould 31c, 31d together with the integrally joined casing components 21c and 21d. To complete the manufacture of the electric motor, the shaft 6c, carrying the motor rotor, the fan impeller 47 and the rolling bearings 5c and 5d press fitted onto it, is inserted, together with the bearing blocks 4c and 4d which hold the rolling bearings 5c, 5d, into the casing components 21c and 21d. The bearing blocks 4c and 4d, which sit with a close fit in the casing components 21c and 21d, are then secured by means of the resilient retention rings 41c or 41d, respectively.

The use of the support cuff 46c permits a simple manufacture of an electric motor by casting its casing components 21c and 21d whilst embedding the winding portions 45c and 45d without making it necessary to carry out additional subsequent machining operation in order to align the seat bores for the bearing blocks 4c, 4d, before inserting them. Moreover, an adequate insulation of the winding portions 45c, 45d is assured. The support cuff 46c forms a uniform and secure external protection for the winding portions 45c, 45d. Since the support cuff 46c is compressed radially during the insertion into the casing mould, a larger internal space for the placing of the support cuff 46c over the winding portions 45c or 45d, respectively, can be chosen between the legs 50 and 51 of the support cuff than that finally available in the support cuff after it is embedded in the casing component 21c or 21d, respectively.

Figure 5:
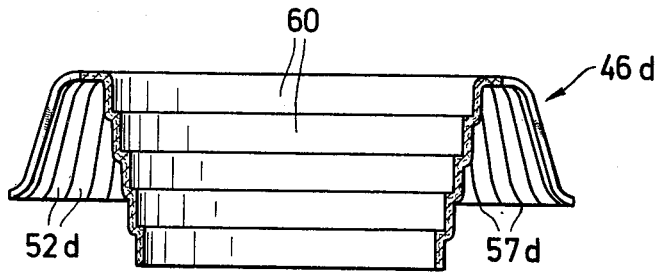
FIG. 5 shows another design of the portion of the squirrel cage motor illustrated in FIG. 3.
Figure 6:
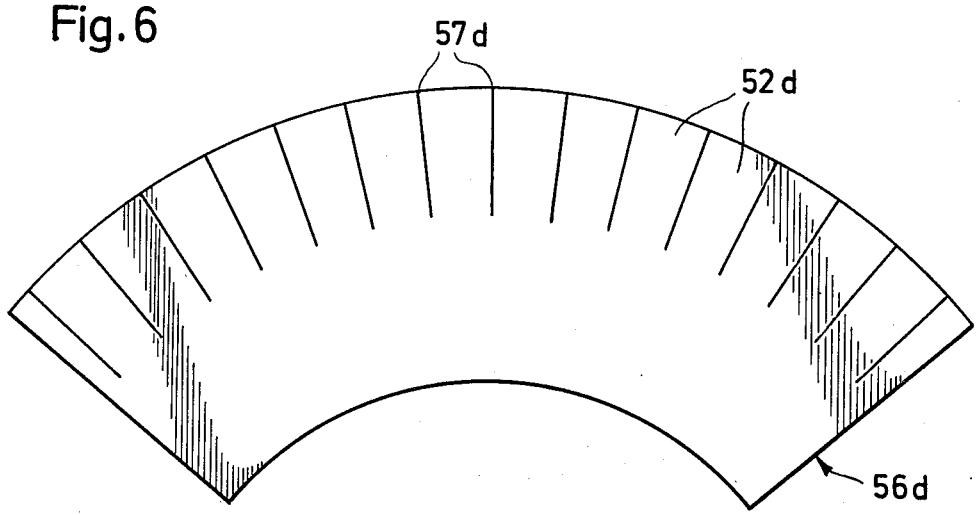
FIG. 6 shows an initial shape of the component illustrated in FIG. 5.
Figure 7:
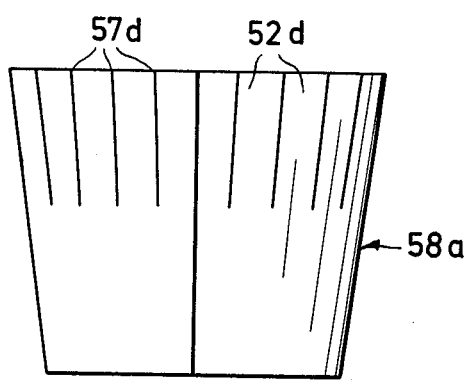
FIG. 7 shows an intermediate shape of the component illustrated in FIG. 5, manufactured from the initial shape according to FIG. 6.
Figure 8A:
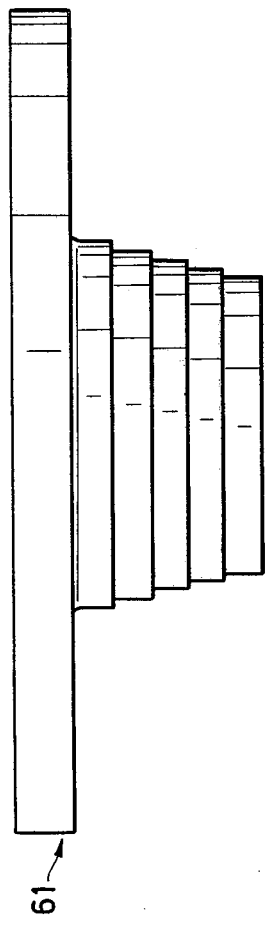
FIGS. 8a and 8b show the top part of a die for the manufacture of the component according to FIG. 5 from the intermediate shape according to FIG. 7.
Figure 8B:
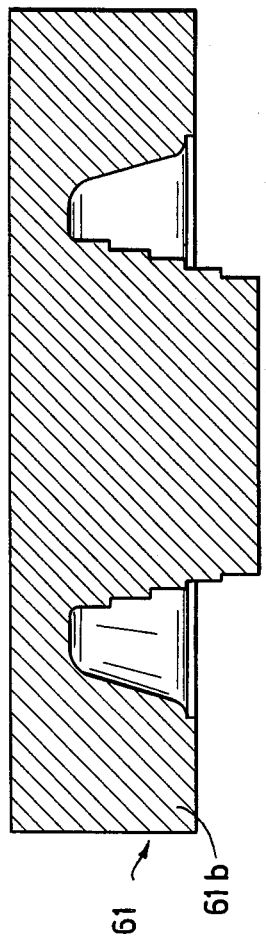
Figure 9:
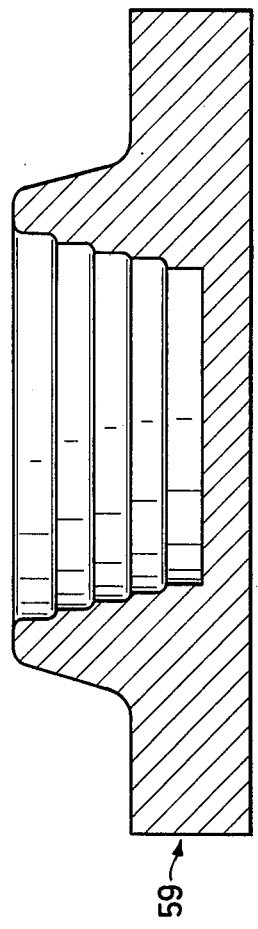
FIG. 9 shows the bottom part of the press-working die to fit the top part according to FIG. 8.

The support cuff illustrated in FIGS. 2 and 3 may be replaced by the support sleeve 46d illustrated in FIG. 5 which has a glass cloth, impregnated with a thermosetting resin, with holes for the throughflow of cast resin. The glass cloth is supplied as a flat blade-shaped component, out of which an arcuate strip 56d is cut, the strip having radial incisions 57d on its outside and is thus frayed. The strip 56d is bent into a hollow cone 58 according to FIG. 7 and is inserted into a lower part 59 (FIG. 9) of a die. This die is formed with inside steps, by which steps 60 are formed on the inner circumference of the support cuff 46d illustrated in FIG. 5, with diameters progressively increasing towards its outer edge. With the help of the upper part 61 of the die, shown in FIG. 8, the inner portion of the support cuff 46d is formed in the presence of heat, so that the frayed edge with the incisions 57d runs out at right angles to the axis of the support sleeve. In a second manufacturing operation with an upper part of the die, the annular part of which is illustrated in FIG. 8b the support cuff 46d is formed into the shape illustrated in FIG. 5.

By means of the steps 60 in the support cuff 46d, which is essentially thin-walled, a relatively large wall thickness of the casing components 21c and 21d, consisting of cast resin, is achieved between the winding 45c or 45d, respectively, and the bearing blocks 4c or 4d, respectively. The step with the smallest diameter corresponds to the sizing ring 55 of the embodiment according to FIGS. 2 and 3.

The shape of the support cuff 46d corresponds in other respects to the shape of the support cuff 46c, illustrated in FIGS. 2 and 3, however, without the formation of the annular bead 54. Between each two incisions 57d of the support cuff 46d, a tab 52d is formed corresponding to the tab 52 of the support cuff 46c. The holes 46 and the elongated apertures 57 of the support cuff 46c, according to FIGS. 2 and 3, are absent in the support cuff 46d, according to FIG. 5, because the glass cloth already has holes for the throughflow of the cast resin. The thermosetting resin used for coating the glass cloth is much nearer to the properties of the cast resin than the thermoplastic material of the support cuff 46c, illustrated in FIGS. 2 and 3, whilst the glass cloth behaves neutrally so that the homogeneity between the casing components 21c and 21d, on the one hand, and the support cuff 46d, on the other hand, is greater than when using the support cuff 46c (FIGS. 2 and 3) instead of the holding sleeve 46d (FIG. 5).

The bearing block 4c or 4d may also be seated in a metal bushing which is embedded in the casing component 21c or 21d, respectively, to which it is firmly joined by casting. The electrically insulating support cuff 46c or 46d is situated between the winding 45c and 45d and the corresponding metal bushing. Instead of the bearing bushings it is also possible to provide a continuous tube through the gap ("can tube").

Figure 10:
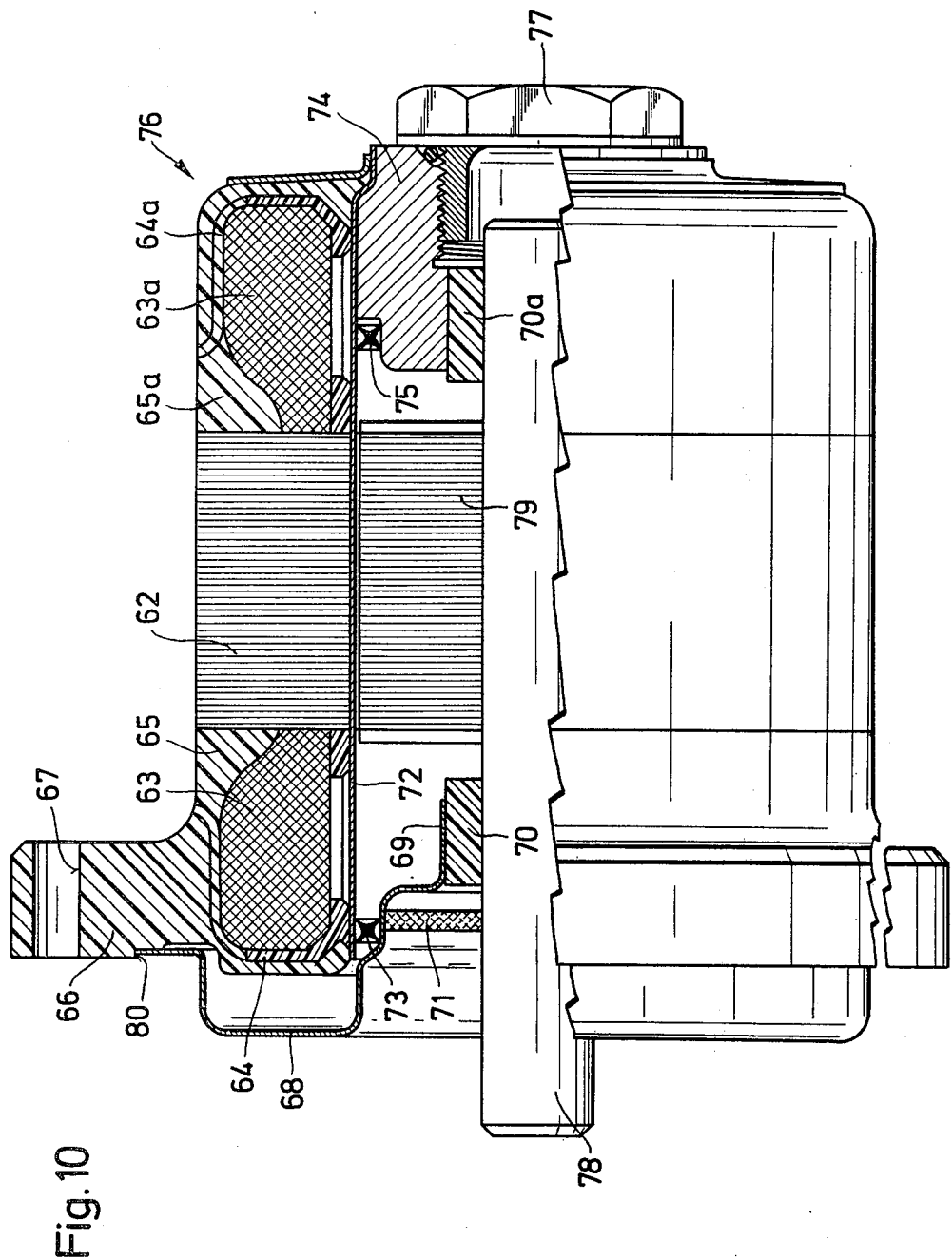
FIG. 10 shows a partial longitudinal cross-section through an example according to a first embodiment.

The electric motor 61 according to FIG. 10 has a stator laminations stack 62, out of which lateral windings 63, 63a protrude. Each of the windings is situated in an annular hood 64, 64a which consists of an electrical insulating material or is at least coated by a layer of such material. The annular hood, 64, 64a which is provided with appropriate holes and apertures is embedded in a casing component 65 or 65a, respectively, which consists of a cast substance and which entirely envelops the windings 63 and 63a, respectively. The casing components 65 and 65a are flush with the stator stack 62 so that its circumference is exposed.

The casing component 65 is integrally joined to a mounting flange 66 which has a ring of mounting holes 67. The mounting flange 66 has a flat recess with a cylindrical spigot surface 67 on the side opposite that of the stator stack 62. A bearing carrier 68 made of sheet metal, in particular stainless steel, radially fits the cylindrical surface 67, being nested in the annular recess of the mounting flange 66. The bearing carrier 68 is held in its axial position by a body, such as, in particular, a pump casing, which is to be attached to the mounting flange 66.

The bearing carrier 68 has several steps. It carries a plain bearing 70 at its tubular end 69 which protrudes into the casing component 65. A filter disc 71 is inserted at a cylindrical location which is radially enlarged compared with the tubular end. The bearing carrier 68 surrounds the casing component 65 with a clearance and is adapted to the body attached to the mounting flange 66, e.g. a pump casing.

At the inner circumference of the casing components 65, 65a and the stator stack 62, a gap tube ("can") 72 is provided which is firmly attached to the casing components 65, 65a. The can 72 extends into the bearing carrier 68 beyond its portion which receives the bearing 70 and the filter disc 71. The clearance between the can 72 and the bearing carrier 68 is sealed by the sealing ring 73.

The can 72 is jogged inwards at its end shown on the right in FIG. 10 and, at this end, seats a substantially annular massive bearing block 74, which is inserted from the direction of the mounting flange 66 and which, over its entire cylindrical surface, is seated in the can. The jogged portion of the can tube 72 dispenses with the use of a retaining ring or similar part to secure the bearing block 74 in its axial position outwards. A sealing 75 is inserted between a spigotted portion in the bearing block 74 and the can tube 72. A plain bearing 70a is arranged in the bearing block 74. A locking screw is screwed into the bearing block 74 on the outside and sealed off by means of a sealing ring.

A shaft 78 is supported in the plain bearings 70, 70a. The shaft carries the rotor 79. A rotating body, in particular a pump impeller, can be attached to the end of the shaft on the side of the mounting flange 66.

Figure 11:
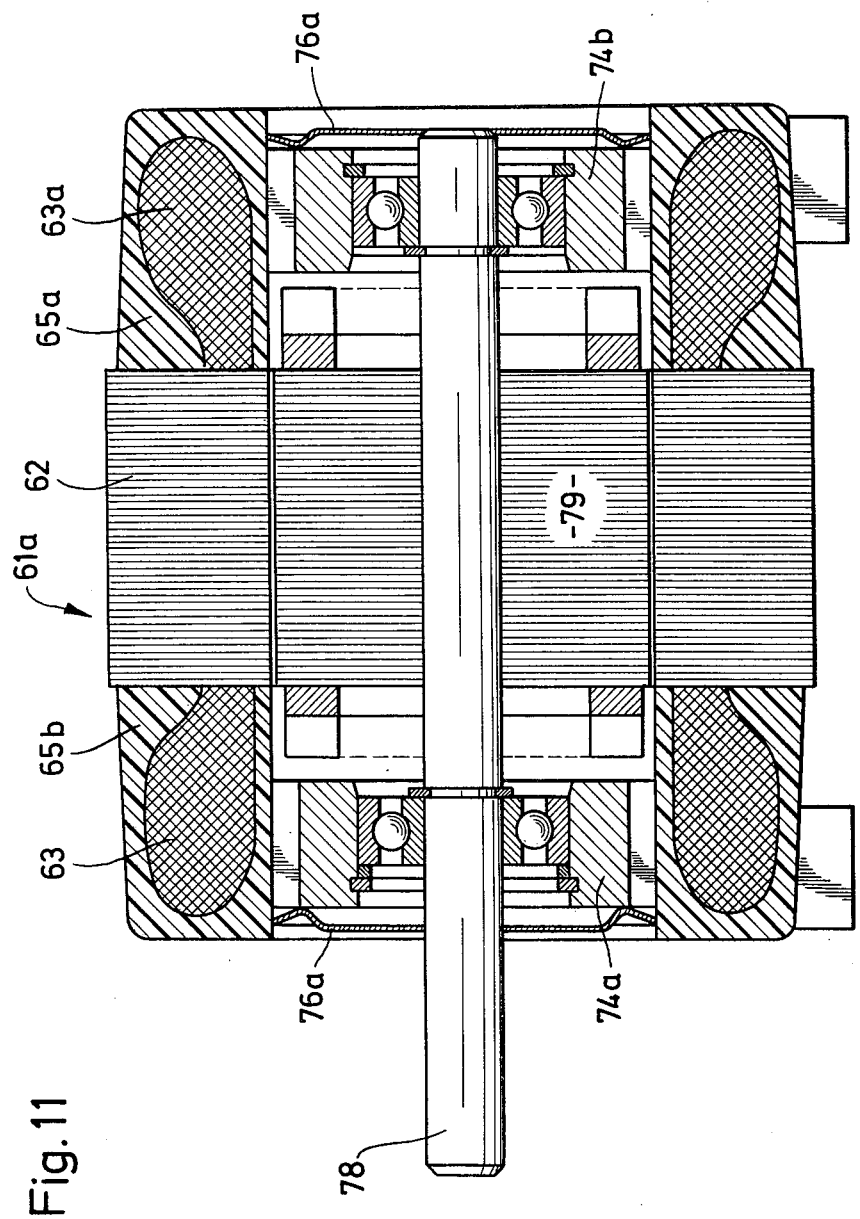
FIG. 11 shows a longitudinal cross-section through an example according to a second embodiment.

In a second example of an embodiment, according to FIG. 11, similar components are given the same identifying numerals. The casing component 65b, arranged on the left is in this embodiment similar to the casing component 65a arranged on the right. The bearing blocks 74a and 74b, inserted with pre-load to compensate for the roundness errors occurring during the curing of the casing components 65a and 65b, are of the same design and are retained in the casing components 65b and 65a, respectively, by resilient retaining rings 76. The bearing blocks 74a, 74b, are made long enough to preclude tilting so that alignment errors are avoided.

The annular bearing blocks 74a and 74b, respectively, have teeth arranged on their outer circumference with substantially equal spacings. The support rings 76a have corresponding teeth. The teeth in the bearing blocks 74a, 74b and in the support rings 76a permit a ventilation of the rotor space of the electric motor 61a. The inside surfaces of the casing components 65a and 65b in the second embodiment will need as little machining as the inside surfaces of the casing 65a and the cylindrical surface 67 of the mounting flange 66 in the first embodiment. In the second embodiment, the stator laminations stack 62 is also exposed to the outside. Two mounting feet are cast integrally on each side with each of the casing components 65b and 65a of the second embodiment. A threaded bushing can be arranged in these feet.

In these embodiment examples it is of advantage that the cylindrical surfaces receiving the bearing blocks need not be machined and that, with annular bearing blocks, the seat bores for the bearing blocks are equalised by being pressed into the casing components so that the two bearings of the electric motor are well aligned and the rotor runs quietly.

I claim:

1. A process for the manufacture of an electric motor, particularly a squirrel cage motor, comprising the steps of providing a split casing mould having a hollow space dimensioned to receive the stator and stator winding portions and a central mandrel-shaped core and to leave voids around the winding portions;

placing a support cuff over each of the winding portions which protrude axially from the stator so that portions of the support cuff lie radially inwardly and outwardly of the winding portions;

inserting the core through the support cuffs and the stator;

placing the assembly including the stator, the windings, the support cuffs and the core into the mould and closing the mould so that those portions of the support cuff lying radially outwardly of the winding portions are pressed radially inward against the winding portions;

filling the voids around the winding portions with curable electrically insulating casting material, and curing the material.

2. A process according to claim 1 wherein the support cuff is formed from a planar arc-shaped strip of glass cloth impregnated with thermosetting resin and having openings for the through flow of casting material, and incisions along its outer edge, the strip having been formed by pressing and the application of heat into a hollow cone-shaped support cuff with an annular portion having a U-shaped cross-section.

3. A process according to claim 1 wherein the mould is provided with mould surfaces for the formation of bores to receive bearing supports.

* * * * *